(12) United States Patent
Suzuki et al.

(10) Patent No.: US 6,415,057 B1
(45) Date of Patent: Jul. 2, 2002

(54) METHOD AND APPARATUS FOR SELECTIVE CONTROL OF DEGREE OF PICTURE COMPRESSION

(75) Inventors: Kazuhiro Suzuki, Kanagawa; Satoshi Mitsuhashi, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 1026 days.

(21) Appl. No.: 08/627,010

(22) Filed: Apr. 3, 1996

(30) Foreign Application Priority Data

Apr. 7, 1995 (JP) .............................................. 7-082994

(51) Int. Cl.[7] ................................................ G06K 9/36
(52) U.S. Cl. ........................ 382/239; 382/103; 382/282
(58) Field of Search ........................... 341/51; 348/405, 348/419, 404; 358/430, 453, 43, 467; 382/103, 117, 239, 282, 291

(56) References Cited

U.S. PATENT DOCUMENTS

| | | | | |
|---|---|---|---|---|
| 4,109,145 A | * | 8/1978 | Graf ............................ 345/157 |
| 4,973,149 A | * | 11/1990 | Hutchinson .................. 351/210 |
| 5,128,776 A | * | 7/1992 | Scorse et al. ............... 358/453 |
| 5,333,212 A | * | 7/1994 | Lightenberg ................ 382/250 |
| 5,351,083 A | * | 9/1994 | Tsukagoshi ................. 348/404 |
| 5,434,576 A | * | 7/1995 | Mack et al. .................. 341/50 |
| 5,444,489 A | * | 8/1995 | Truong et al. .............. 348/408 |

* cited by examiner

Primary Examiner—Timothy M. Johnson
(74) Attorney, Agent, or Firm—Frommer Lawrence & Haug LLP; William S. Frommer; Gordon Kessler

(57) ABSTRACT

A method for picture compression which may be used with advantage for compressing a picture. The picture compression apparatus includes a compression unit for compressing input picture data, a basic compression ratio setting unit for setting the basic compression ratio in compressing the input picture data by the compression unit, a designating unit for designating an optional area in the input picture, a designated area importance setting unit for setting the importance in compressing the input picture data corresponding to the area designated by the designation unit and a compression ratio modifying unit for modifying the basic compression ratio based upon the importance for the designated area as set by the designated area importance setting unit. An optional area in an input picture is designated, and importance attached to the designated area is set, so that the picture in the designated area can be compressed with the desired importance. The post-compression bit rate can be accommodated within the target bit rate by modifying the basic compression ratio based upon the importance of the designated area. A corresponding apparatus for compressing an input picture data is also disclosed.

21 Claims, 12 Drawing Sheets

METHOD AND APPARATUS FOR SELECTIVE CONTROL OF DEGREE OF PICTURE COMPRESSION

BACKGROUND OF THE INVENTION

1. Field of the Invention

This invention relates to a method and apparatus for picture compression which may be used with advantage for compressing a picture.

2. Description of the Related Art

FIG. 1 shows a conventional arrangement of a picture compression apparatus employed with advantage for encoding a picture for compression.

In the picture compression apparatus, shown in FIG. 1, picture data digitized with the following numbers of pixels are supplied to an input terminal 1, as shown in FIG. 2:
luminance components (Y): 352(H)×240(V)×30 frames
chroma components (Cb): 176(H)×120(V)×30 frames
chroma components (Cr): 176(H)×120(V)×30 frames The input picture data, supplied to the input terminal 1, are sent to a motion detector 20 and a block divider 11 via a frame memory 10 designed to store the input picture data transiently and to interchange the data sequence appropriately.

The block divider 11 divides each frame supplied from the frame memory 10 into blocks of 8×8 pixels for luminance components Y and chroma components Cr, Cb, as shown in FIG. 3. The four blocks Y0, Y1, Y2 and Y3 of luminance components Y, one block of chroma components Cb and one block Cr of chroma components, totalling six blocks, are termed a macro-block MB.

The macro-block based data from the block divider 11 is sent to a subtractor 12.

The subtractor 12 finds a difference between data from the block divider 11 and inter-frame prediction picture data as later explained and transmits a difference output to a fixed contact b of a changeover switch 13 as frame data to be encoded by inter-frame predictive coding as later explained. To the opposite side fixed contact a of the changeover switch 13 are supplied data from the block divider 11 as frame data to be intra-coded as later explained.

The block-based data from the changeover switch 13 are discrete-cosine-transformed by a DCT circuit 14 to produce DCT coefficients which are then supplied to a quantizer 15. The quantizer 15 quantizes the DCT output at a pre-set quantization step width to produce quantized DCT coefficients (quantized coefficients) which are then supplied to a zigzag scan circuit 16.

The zigzag scan circuit 16 re-arrays the quantized coefficients by zig-zag scan as shown in FIG. 4. The resulting output is supplied to a variable length encoding circuit 17. The variable length encoding (VLC) circuit 17 variable length encodes the output data of the zigzag scan circuit 16 and sends the VLC output to an output buffer 18. The variable length encoding circuit 17 also sends the information specifying the code amount from the variable length, encoding circuit 17 to a quantization step controller 19. The quantization step controller 19 controls the quantization step width of the quantizer 15 based upon the information specifying the code amount from the variable length encoding circuit 17. Output data of the output buffer 18 is outputted at an output terminal 2 as compressed encoded data.

An output of the quantizer 15 is dequantized by a dequantizer 27 and further inverse discrete-cosine-transformed by an inverse DCT circuit 26. An output of the inverse DCT circuit 26 is supplied to an adder 25.

To the adder 25 is supplied inter-frame prediction picture data from a motion compensator 21 via a changeover switch 24 turned on for a frame for inter-frame predictive coding. The inter-frame prediction picture data is added by the adder 25 to output data of the inverse DCT circuit 26. Output data of the adder 25 is transiently stored in a frame memory 22 and thence supplied to the motion compensator 21.

The motion compensator 21 performs motion compensation based upon the motion vector detected by the motion detector 20 and outputs the resulting inter-frame prediction picture data.

An illustrative operation of the conventional picture compression apparatus shown in FIG. 1 is explained in detail. For explanation sake, the following appellations of the respective frames are used.

First, the frames arrayed in the display sequence are termed I0, B1, B2, P3, B4, B5, P6, B7, B8, I9, B10, B11, B12, ... Of these frames, I, P and B specify the methods of compression, as later explained, and the numerical figures affixed to I, P and B simply specify the display sequence.

Of the Moving Picture Expert Group (MPEG), a work group for international standardization of the color moving picture encoding system, the MPEG1 provides the following for compressing the above pictures.

First, the picture I0 is compressed.

Next, in compressing the picture P3, difference data between P3 and I0 is compressed in place of the picture P3 itself.

Next, in compressing the picture B1, difference data between B1 and I0, difference data between B1 and P3 or difference data between B1 and a mean value of I0 and P3, whichever is smallest in information amount, is compressed in place of the picture B1 itself.

Next, in compressing the picture B2, difference data between B2 and I0, difference data between B2 and P3 or difference data between B2 and a mean value of I0 and P3, whichever is smallest in information amount, is compressed in place of the picture B2 itself.

Next, in compressing the picture P6, difference data between P6 and P3 is compressed in place of the picture P6 itself.

The following is the representation of the above processing

| picture being processed | counterpart picture(s) for difference taking |
|---|---|
| (1) I0 | — |
| (2) P3 | I0 |
| (3) B1 | I0 or P3 |
| (4) B2 | I0 or P3 |
| (5) P6 | P3 |
| (6) B4 | P3 or P6 |
| (7) B5 | P3 or P6 |
| (8) P9 | P6 |
| (9) B7 | P6 or P9 |
| (10) B8 | P6 or P9 |
| (11) I9 | — |
| (12) P12 | I0 |
| (13) B10 | I9 or P12 |
| (14) B11 | I9 or P12 |

Thus the encoding sequence. is partially interchanged in sequence from the display sequence and becomes:

I0, P3, B1, B2, P6, B4, B5, P9, B7, B8, I9, P12, BI0, B11,
The compressed data, that is encoded data, is arrayed in this sequence.

The reason the pictures are arrayed in this manner is now explained in connection with the operation of the arrangement shown in FIG. 1.

In encoding the first picture 10, data of a first picture to be encoded, supplied from the frame memory 10, is blocked by the block divider 11. The block divider 11 outputs block-based data in the sequence of Y0, Y1, Y2, Y3, Cb and Cr and transmits the data to the DCT circuit 14 via the changeover switch 13 the movable contact of which is set to the fixed contact a. The DCT circuit 14 executes two-dimensional DCT on the respective blocks for transforming the data from time axis to the frequency axis.

The DCT coefficients from the DCT circuit 4 are routed to the quantizer 15 so as to be quantized at a pre-set quantization step width. The quantized coefficients are then re-arrayed in a zig-zag order by the zing-zag scan circuit 16, as shown in FIG. 4. If the quantized coefficients are re-arrayed in the zig-zag order, the coefficients are arrayed in the order of increasing frequency so that the values of the coefficients become smaller in a direction proceeding towards the trailing end of the coefficient array. Therefore, if the coefficients are quantized with a given value S, the results of quantization tend to become zero towards the trailing end so that high-frequency components are cut off.

The quantized components are then sent to the variable length encoding circuit 17 where they are encoded by Huffman coding. The resulting compressed bitstream is transiently stored in the output buffer 18 from which it is transmitted at a constant bit rate. The output buffer 18 is a buffer memory for outputting an irregularly produced bitstream at a constant bit rate.

The above-described encoding for the picture by itself is termed intra-frame coding. The encoded picture is termed an I-picture.

If a decoder receives the bitstream for the I-picture, the above procedure is followed in the reverse order to complete the first picture.

The encoding for the second picture P3 is as follows:

The second and the following pictures may be encoded into bitstreams as I-pictures. However, for raising the compression ratio, the following method is us,ed by exploiting the fact that the contents of contiguous pictures exhibit correlation.

First, the motion detector 20 finds out, for each macro-block of the second picture, a pattern in the first picture I0 having similarity to the macro-block under consideration, and represents the pattern by a coordinate of the relative position termed a motion vector (x,y).

In the second picture, the block is not directly transmitted to the DCT circuit 14, as in the first picture described above. Instead, difference data between the block under consideration and a block referenced from the first picture depending on the motion vector for the block in consideration, is found by the subtractor 12 and thence supplied to the DCT circuit 14. The method of detecting the motion vector is discussed in detail in ISO/IEC 111172-2 annex D.6.2 and hence is not elucidated herein.

If strong correlation persists between the pattern of the first picture indicated by the motion vector and the pattern of the block being encoded, the difference data becomes small so that the volume of the compressed data becomes smaller on encoding the motion vector and the difference data than on encoding the pattern by intra-frame coding.

This compression method is termed an inter-frame predictive coding. However, a smaller amount of difference data does not necessarily lead to a reduced amount of compressed data. Thus there are occasions wherein, depending on the picture pattern, that is on the picture contents, intra-frame coding leads to a higher encoding efficiency than difference taking. In such case, the intra-frame coding is used for encoding. Which of the inter-frame coding and intra-frame coding is to be used is to be determined from macro-block to macro-block.

The above encoding procedure is explained in connection with the picture compression apparatus shown in FIG. 1. For executing inter-frame predictive coding, it is necessary to provide the same picture as that produced on a decoder on an encoder.

To this end, there is provided in the encoder a circuit which is the same as that provided in the decoder. This circuit is termed a local decoder. The dequantizer 27, inverse DCT circuit 26, adder 25, frame memory 22 and the motion compensator 21 make up the local decoder. The picture stored in the frame memory 22 is termed a locally decoded picture or locally decoded data.

Conversely, the pre-compression picture data is termed an original picture or original data.

Meanwhile, the first picture decoded by the local decoder is stored in the frame memory 22 during compression of the I-picture. Noteworthy is the fact that the picture produced by this local decoder is not the pre-compression picture but is a picture restored on compression, that is the picture deteriorated in picture quality by compression, or the same picture as that decoded by the decoder.

The original data of the second picture P3 enters the encoder under this condition. The motion vector must have been detected before this stage. The data has a motion vector from block to block. This vector is applied to the motion compensator 21. The motion compensator 21 outputs data of the locally decoded picture indicated by the motion vector, that is motion compensation data (MC data), for one macro-block, as the inter-frame prediction picture data.

The subtractor 12 finds a pixel-based difference between the original data of the second picture and the motion compensation data (inter-frame prediction picture data). The difference data is supplied to the DCT circuit 14. The subsequent compression method is basically the same as that for the I-picture. The picture compressed by the above-described compression method is termed a predicted picture or P-picture.

More specifically, all macro-blocks are not necessarily compressed by inter-frame encoding in a P-picture. If it is judged that intra-frame prediction is more efficient for a macro-block being encoded, the macro-block is encoded by intra-frame encoding.

That is, in the P-picture, one of the intra-frame encoding and the inter-frame encoding is selected form one macro-block to another, for compressing a given macro-block. The macro-block encoded by the intra-frame encoding or by the inter-frame encoding is termed an intra-macro-block or inter-macro-block, respectively.

In the local decoder, the output of the quantizer 15 is dequantized by the dequantizer 27 and inverse DCTed by the inverse DCT circuit 26 so as to be then summed to the motion compensation data (MC data) to provide an ultimate locally decoded picture.

The third picture B1 is encoded as follows:

In encoding the third picture B1, the motion vector for each of the two pictures I0 and P3 is searched. The motion vector for I0 and that for P3 are termed a forward vector Mvf(x,y) and a backward vector Mvb(x,y), respectively.

For this third picture, difference data is compressed. It is crucial which data is to be compressed. In this case, too, the picture which gives the smallest information amount is selected in taking the difference. There are four alternatives possible for the compression method, that is (1) difference with data of the picture I0 indicated by the forward vector Mvf(x,y);

(2) difference with data of the picture P3 indicated by the backward vector Mvb(x,y);

(3) difference with mean values between the difference with data of the picture I0 indicated by the forward vector Mvf(x,y) and the difference with data of the picture P3 indicated by the backward vector Mvb(x,y); and (4) no difference data is employed, that is intra-frame encoding is used. One of the four compression methods is selected on the macro-block basis. For the alternatives (1) to (3) of the compression method, the respective motion vectors are also supplied to the motion compensator 21 where the differences are found with respect to the motion vectors and supplied to the DCT circuit 14. For the alternative (4), the data is directly transmitted to the DCT circuit 14.

The above processing becomes possible since the two pictures I0 and P3 have been restored and present in the frame memory 22 adapted for storing the locally decoded pictures.

The fourth picture B2 is encoded as follows:

The fourth picture B2 is encoded in the same way as in the method for encoding the third picture except that the picture B1 reads B2.

The fifth picture P6 is encoded as follows:

The fifth picture P6 is encoded in the same way as in the method for encoding the second picture except that the pictures P3 and I0 read P6 and P3, respectively.

The encoding of the sixth picture and so forth is simply the repetition of the above processing and hence the corresponding description is omitted.

The MPEG also provides a group-of-pictures.

That is, a set of several pictures is termed a group-of-pictures (GOP) which must be a set of pictures contiguous to one another when seen as encoded data, that is compressed data. In addition, the GOP takes the random accessing into account and hence the picture which comes first in the GOP in the encoded data must be an I-picture, while the last picture in the GOP in the display sequence must be an I-picture or a P-picture.

FIGS. 5A and 5B show an example of GOPs including a GOP made up of four pictures followed by GOPs each made up of six pictures. FIGS. 5A and 5B show the display sequence and the sequence of the encoded data, respectively.

If attention is directed to the GOP 2 in FIGS. 5A and 5B, it is seen that, since B4, B5 are formed from P3, I6, while there is no P3, the pictures B4 and B5 cannot be decoded correctly on accessing I6 by random accessing. The GOP which cannot be correctly decoded within the GOP itself is termed a closed GOP.

Conversely, provided that B4 and B5 refers only to I6, P3 is unnecessary even if I6 is accessed by random accessing, so that B4, B5 can be decoded correctly. The GOP which can be correctly decoded within the GOP itself is termed an open GOP.

The compression method which gives the maximum encoding efficiency is selected from among the alternatives of the compression method. The ultimate amount of the encoded data also depends upon the input picture and can be comprehended only on compressing the data.

However, it is also necessary to manage control for providing a constant bit rate of the compressed data. The parameters used for such control include a quantization step or quantization scale (Q-scale). The larger or smaller the quantization step, the smaller or larger becomes the amount of generated bits for the same compression method, respectively.

The following is the manner of controlling the value of the quantization step.

For providing a constant bit rate of the compressed data, the encoder has an output buffer 18 adapted for absorbing the picture-based difference in the amount of generated data to a limited extent.

However, if data is produced in an amount exceeding the pre-set bit rate, the residual amount in the output buffer 18 is increased until overflow eventually occurs. Conversely, if data is produced in an amount lower than the pre-set bit rate, the residual amount in the output buffer 18 is decreased until underflow eventually occurs.

Thus the encoder feeds back the residual amount of the output buffer 18 for controlling the quantization step of the quantizer by the quantization step controller 19. Specifically, the encoder manages control for reducing the quantization step for avoiding excessive compression if the residual amount in the output buffer 18 is decreased. The encoder also manages control for increasing the quantization step for raising the compression ratio if the residual amount in the output buffer 18 is increased.

On the other hand, there is a significant difference in the range of the amount of the encoded data generated by the above-given compression methods, that is the intra-frame coding or the inter-frame coding.

In particular, if the intra-frame coding is employed for compression, a large amount of data is produced, so that, if the vacant capacity of the output buffer 18 is small, the quantization step size must be increased. As the case may be, the overflow of the buffer 18 may be incurred even with the maximum quantization step width. Granted that the data can be stored in the buffer 18, the intra-frame encoded picture produced with the larger quantization step affects the quality of the subsequently produced inter-frame coded picture. Thus, a sufficient vacant capacity must be provided in the output buffer 18 prior to proceeding to intra- frame coding.

Thus the compression methods of a pre-set sequence are set in advance and the quantizatior step controller 19 manages feedback control of the quantization step size for assuring b sufficient vacant capacity of the output buffer 18 prior to proceeding to intra-frame coding. This allows to suppress the encoded data to a pre-set rate.

Recently, a demand is raised for more efficient compression of the picture information. That is, it has recently been envisaged to achieve more efficient compression. by achieving the target bit rate as the deterioration caused by compress-ion is avoided as far as practicable by curtailing the information by taking into account the psychoacoustic mechanism of the visual sense of the human being, or by varying the compression ratio depending upon the amount of the information owned by the input information or the amount of the information owned by the picture pattern for the same picture. Also, a variety of algorithms have been devised for implementing such data compression.

However, notwithstanding. these endeavors, it occurs frequently that the satisfactory picture quality cannot be achieved depending upon the target bit rate or complexity of the input picture. For example, if the technique of varying the compression ratio depending upon the amount of information owned by the input picture is resorted to, data compression may occur in a manner contrary to the intention of the picture producer. That is, if the technique of varying the compression ratio depending upon the amount of. information owned by the input picture is resorted to, data compression may occur without regard to whether the picture portion is or is not crucial for the picture producer. In other words, it may occur that the picture portion crucial to the picture producer undergoes deterioration in picture quality while a large amount of bits are consumed for the picture portion not crucial to the picture producer. On the other hand, it is impossible for the compression apparats to take into account the intention of the picture producer automatically on the basis of the input picture.

SUMMARY OF THE INVENTION

It is therefore an object of the present invention to provide a method and apparatus for picture compression whereby compression may be achieved in a manner of reflecting the intention of the picture producer without deviating from the target bit rate.

In one aspect, the present, invention provides a picture compression apparatus having means for compressing input picture data, basic compression ratio setting means for setting the basic compression ratio in compressing the input picture data by said compression means, means for designating an optional area in the input picture, designated area importance setting means for setting the importance in compressing the input picture data corresponding to the area designated by the designation means, and compression ratio modifying means for modifying the basic compression ratio based upon the importance for the designated area as set by the designated area importance setting means.

In another aspect, the present invention provides a picture compressing method including the steps of setting a basic compression ratio in compressing input picture data, designating an optional area in an input picture, setting the importance in compressing the input picture data corresponding to the area designated by the designating step, modifying the basic compression ratio based upon the importance for the designated area as set by the designated area importance setting step, and compressing the input picture data using the compression ratio obtained by the compression ratio modifying step.

With the method and apparatus for picture compression according to the present invention, an optional area contemplated by the picture producer is designated in compressing input picture data. The picture in the designated area can be compressed by setting importance to be attached to the designated area. If importance to be attached to the designated area is raised, the area contemplated by the picture producer can be raised in picture quality. In addition, the post-compression bit rate may be accommodated within the target bit rate by modifying the basic compression ratio based upon the importance attached to the designated area.

According to the present invention, an optional area in an input picture is designated, and importance attached to the designated area is set, so that the picture in the designated area can be compressed with the desired importance. The post-compression bit rate can be accommodated within the target bit rate by modifying the basic compression ratio based upon the importance of the designated area.

DESCRIPTION OF THE PREFERRED EMBODIMENTS

Figure 1:
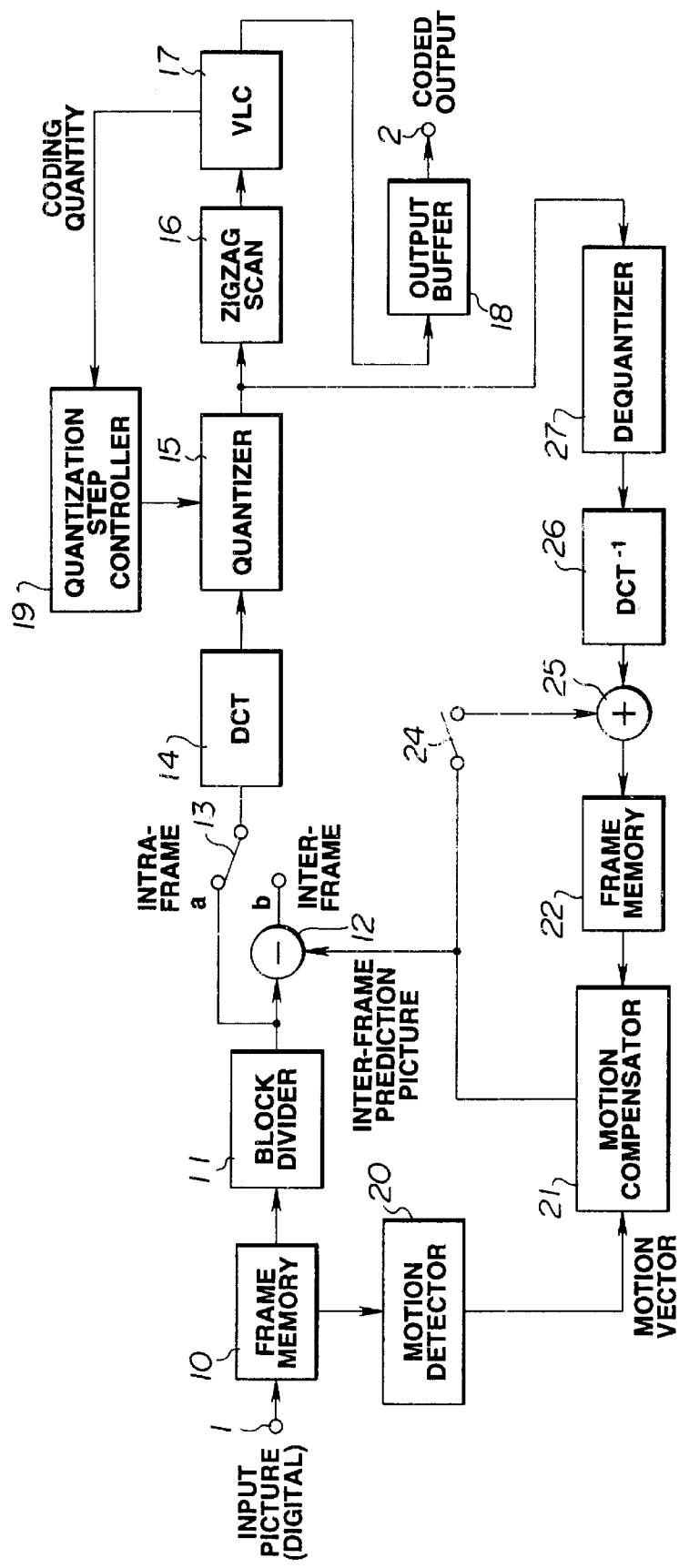
FIG. 1 is a schematic block circuit diagram showing an arrangement of a conventional picture compression apparatus.

Referring to the drawings, preferred embodiments of the present invention will be explained in detail.

Figure 6:
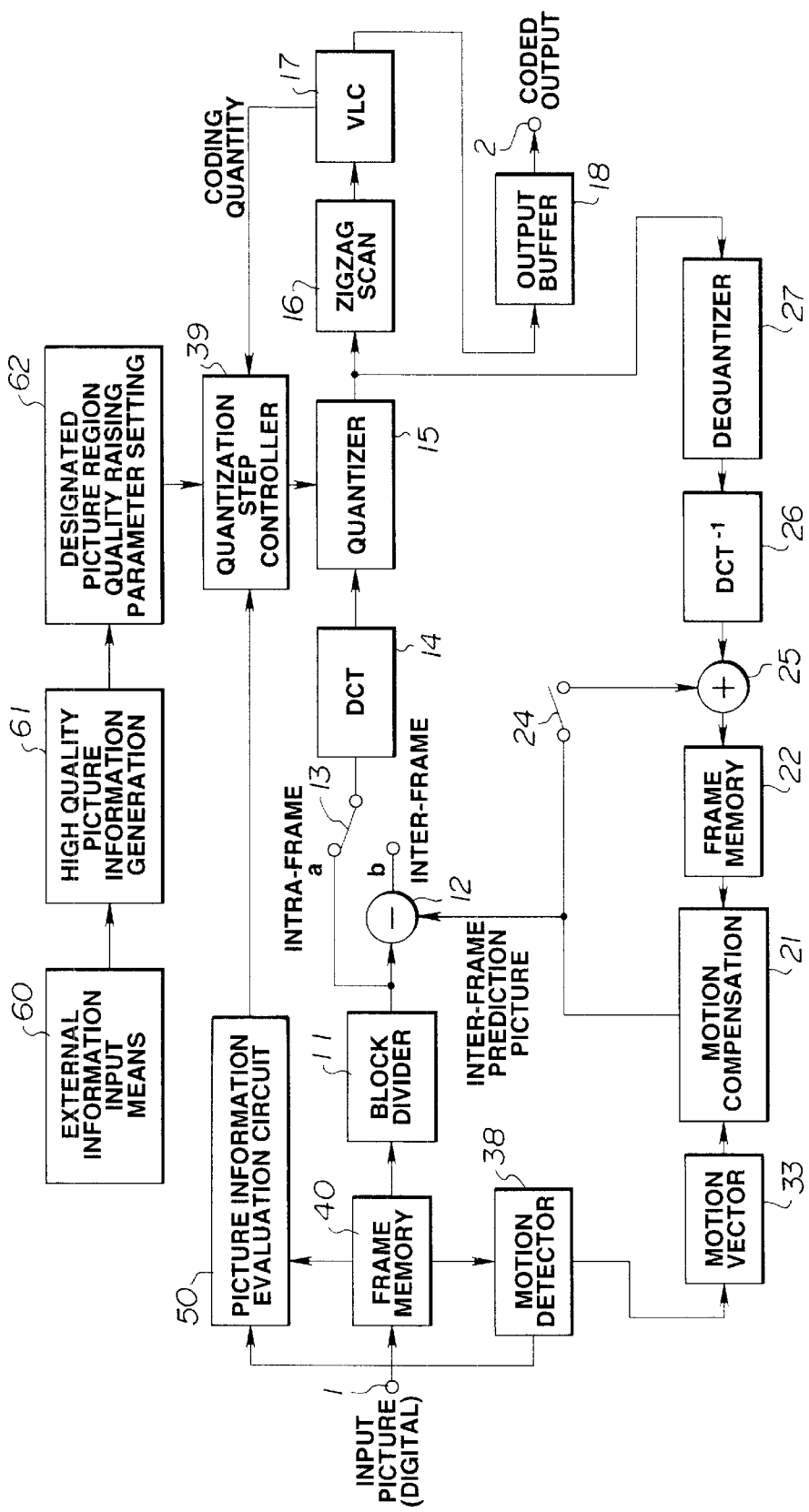
FIG. 6 is a schematic block circuit diagram showing an arrangement of a picture compression apparatus according to an embodiment of the present invention.

FIG. 6 shows a schematic arrangement of a picture compression apparatus according to a preferred embodiment of the present invention. In FIG. 6, the parts or components which are the same as those of the arrangement shown, in FIG. 1 are denoted by the same numerals and the corresponding description is omitted for clarity.

Figure 2:
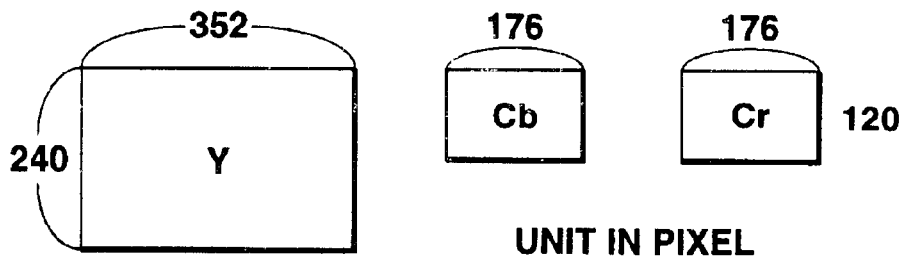
FIG. 2 illustrates the resolution and construction of a picture.
Figure 3:
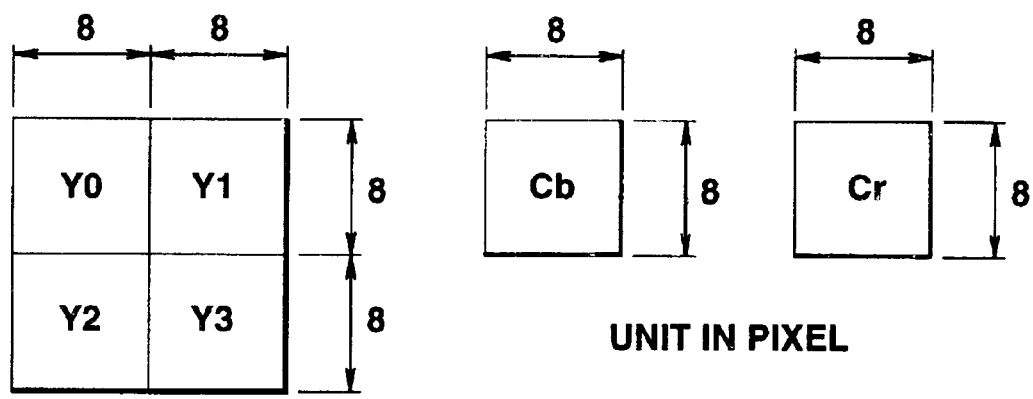
FIG. 3 illustrates a macro-block and a block.

In the picture compression apparatus, shown in FIG. 6, digitized picture data shown in FIG. 2 is supplied to an input terminal 1. The input picture data, supplied to the input terminal 1, is supplied to a motion detector 38 and a block divider 11 via a frame memory 40 adapted to store the input picture data transiently to interchange the sequence of the picture data appropriately. The block divider 11 divides the respective frames, supplied from the frame memory 40, into blocks each composed of 8×8 pixels, as shown in FIG. 3. The macro-block based data from the block divider 11 are sent to a subtractor 12.

The subtractor 12 finds the difference between data from the block divider 11 and the inter-frame prediction picture data and routes the resulting output to a fixed contact b of a changeover switch 13 as data of a frame to be encoded by inter-frame predictive coding. To the other fixed contact b of the changeover switch 13 are supplied data from the block divider 11 as data of the frame to be intra-coded.

Figure 4:
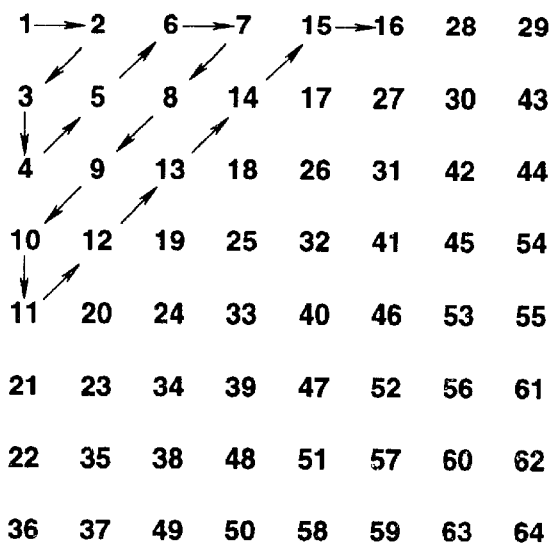
FIG. 4 illustrates zig-zag scan.
Figure 5A:
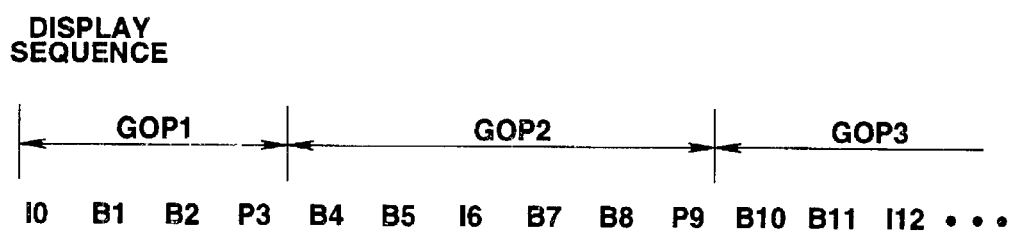
FIGS. 5A and 5B illustrate an example of GOPs.
Figure 5B:
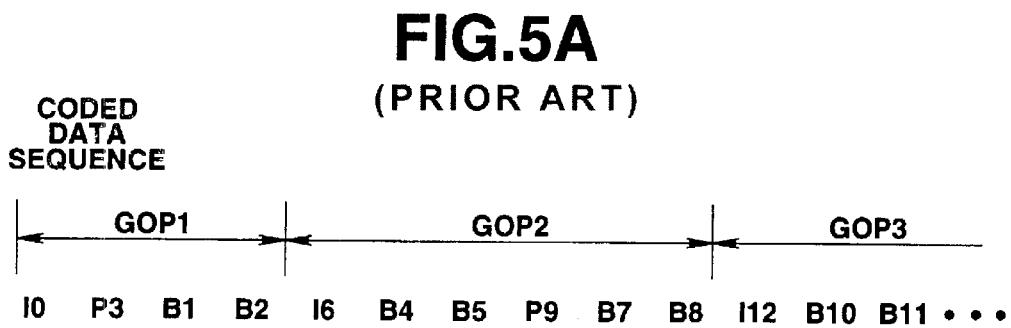

The block-based data via the changeover switch 13 is discrete DCTed by a DCT circuit 14 to produce DCT coefficients which are supplied to a quantizer 15 which is a part of compression means. The quantizer 15 quantizes the DCT output at a pre-set quantization step width to produce quantized coefficients which are supplied to a zig-zag scan circuit 16. The zigzag scan circuit 16 re-arrays the quantized coefficients by zig-zag scan as shown in FIG. 4. The resulting output is supplied to a variable length encoding circuit 17. The variable length encoding (VLC) circuit 17 variable length encodes the output data of the zigzag scan circuit 16 and sends the VLC output to an output buffer 18. Output data of the output buffer 18 is outputted at an output terminal 2 as encoded compressed data. The encoded information, outputted at the output terminal 18, is recorded on a disc-shaped recording medium, such as magnetic disc, including a hard disc or a flexible disc, optical disc, magneto-optical disc or a phase-change disc, tape-shaped recording medium, such as a magnetic tape, or a semiconductor memory, such as an IC card, or decoded to picture signals, which are directly sent to a variety of display apparatus, such as Braun tube (CRT), or a flat panel display, such as liquid crystal display, plasma display or flat emission display. The VLC circuit 17 outputs the information specifying the amount of codes generated by the variable length coding. This information is sent to an quantization step controller 39 also functioning as compression ratio modifying means and data rate control means.

An output of the quantizer 15 is dequantized by a dequantizer 27 and further inverse DCTed by an inverse DCT circuit 26, an output of which is sent to an adder 25.

To the adder 25 is supplied inter-frame prediction picture data from a motion compensator 21 via a changeover switch 24 turned on for a frame for inter-frame predictive coding. The inter-frame prediction picture data is added by the adder 25 to output data of the inverse DCT circuit 26. Output data of the adder 25 is transiently stored in a frame memory 22 and thence supplied to the motion compensator 21.

The motion compensator 21 performs motion compensation based upon the motion vector generated by a motion vector generator 33 responsive to the motion information detected by the motion detector 38 and outputs the resulting inter-frame prediction picture data.

In the picture encoding apparatus of the instant embodiment, the frame memory 40 is able to store plural input picture data. The picture data stored in the frame memory 40 is sent to a picture information evaluation circuit 50 designed to set a basic compression ratio (a parameter of the information volume employed for finding the basic quantization step width as later explained).

The picture information evaluation circuit 50 evaluates the amount of the information owned by the input picture for calculating parameters employed by the quantization step controller 39 in controlling the quantization step width. Specifically, the information specifying the amount of the information of the picture itself is calculated as the first parameter for enabling prediction of the amount of the compressed data in case of compression by intra-frame coding. The first parameter may, for example, be statistic data or the sum of DCT coefficients produced on block-based DCT on picture data supplied from the frame memory 40. If such data or sum is excessively large, the parameter may also be a block-based sum of the mean square errors. At any rate, the picture information evaluation circuit 50 calculates the first parameter representing the amount of the picture information and which is sufficient to infer the amount of the compressed data (post-compression data volume) In addition, the picture information evaluation circuit 50 calculates, as a second parameter, the information allowing to predict the amount of the compressed data in case of compressing data by inter-frame predictive coding and specifying the amount of the difference picture information. This second parameter may be the sum of block-based difference values between the picture stored in the frame memory 40 and the motion-compensated picture. For calculating the second parameters, it is possible to use the minimum detection error for detecting the motion vector by a usual motion detection circuit (motion detector 38 and motion vector generating circuit 33). As the second parameter allowing to predict the volume of the compressed data by inter-frame predictive coding, it is possible to use not only the motion vector produced by the motion vector detection circuit for usual luminance information by itself (motion detector 38 and the motion vector generating circuit 33) and the minimum error as found only with the luminance information for which the motion vector has been detected, but also the minimum error as found for the chroma information for which. the motion vector has been detected.

The evaluated value of the picture information calculated by the picture information evaluation circuit 50, referred to hereinafter as the information volume parameter, is sent to the quantization step controller 39. The purpose of sending the evaluated value from the picture information evaluation circuit 50 to the quantization step controller 39 is to manage control for lowering the bit rate of the compressed information to the target bit rate as the information volume obtained on evaluation of the input picture information is employed for avoiding the deterioration of the picture quality by compression as much as possible.

Thus it is possible for the quantization step controller 39 to control the quantization step width of the quantizer 15 based upon the code amount information from the VLC circuit 17 and the information volume parameter calculated by the picture information evaluation circuit 50. This prohibits overflow of the output buffer 18 from occurring. That is, by taking into account the information volume parameter in. controlling the quantization step width, it becomes possible to control the quantization step responsive to variation in the picture information quantity more appropriately than when feeding back only the residual amount of the output buffer 18.

However, even if, when compression encoding the picture information, the quantization step width is controlled for lowering the bit rate of the compressed information to the target bit rate as the picture information evaluation value is taken into account, it may be an occurrence that, depending upon the target bit rate or the complexity of the input picture, good picture quality cannot be achieved. That is, even if the quantization step width is controlled responsive to the volume of the information owned by the input picture, it may be an occurrence that, since the compression is done without taking into account the intention of the picture producer, the picture quality level remains unsatisfactory to the picture producer. Specifically, with the above-described bit rate controlling method, data compression may occur without regard to whether the picture portion is or is not crucial for the picture producer. That is, the picture portion crucial to the picture producer tends to be deteriorated in picture quality despite the fact that a large amount of bits are consumed for the picture portion not crucial to the picture producer.

For achieving data compression in a manner of reflecting the intention of the picture producer without deviating from the target bit rate, the picture compression apparatus of the instant embodiment includes an external information inputting unit 60 and a high picture quality specifying information generating circuit 61, as designating means for designating an arbitrary area of the input picture, and a parameter setting circuit 62 for setting the relative importance for picture data compression associated with the designated area, that is the parameter for finding the quantization step width.

The external information inputting unit 60 is a so-called joystick, mouse, track ball, tablet or a keyboard, which may be used alone or in combination, and represents man-machine interfacing means for an operator, such as a picture producer, to enter the information to the compression apparatus. The operator acts on the external information inputting unit 60, as the input picture is displayed on a display screen of the display unit, for designating a picture including an area to be raised in picture quality and the area to be raised in picture quality from the picture displayed on the display unit.

That is, the operator first designates the picture including the area desired to be raised in picture quality. Specifically, the picture including the area desired to be raised in picture quality is designated by displaying an index picture, such as a circular cursor, on the picture screen on which the designated picture is displayed, and by specifying an optional area on the screen using the circular cursor. Meanwhile, the cursor for specifying the area to be raised in picture quality may also be rectangular or elliptical in shape in addition to being circular. The longitudinal and transverse size or the shape of the cursor may be freely changed by operating the cursor movement means, such as joystick, in the external information inputting unit 60.

The area to be raised in picture quality may be designated on viewing the pre-compression input picture or on viewing a playback picture reproduced after compressing and subsequently expanding the input picture. That is, the area to be raised in picture quality may be designated before compression, after viewing the reproduced picture or while viewing the reproduced picture, that is by real-time designation. In particular, if the area to be raised in picture quality is designated as the operator views the reproduced picture produced after the process of compression followed by expansion, the operator may comprehend the area deteriorated by compression and hence identify the area to be raised in picture quality easily. If the operator designates the area to be raised in quality as he or she views the reproduced picture, the picture. including the area designated to be raised in quality is re-compressed and the re-compressed picture is introduced into a relevant portion in the series of the initially compressed pictures. More specifically, if, in a given series of pictures continuing for a pre-set time duration, the respective pictures of the series of pictures are compressed by MPEG1 or MPEG2, the picture inclusive of the area designated to be raised in picture quality is extracted in its entirety. The extracted picture is re-compressed so that the designated area is raised in picture quality and the remaining area is lowered in relative importance while the target bit rate is maintained. The resulting re-compressed picture is interchanged for the extracted picture in the series of pictures. The system configuration and operation in case of real-time designation will be explained subsequently.

A plurality of areas to be raised in picture quality may also be designated in the same picture. In such case, an area is first designated and another area is subsequently designated by an addition mode. In the addition mode, any desired number of areas may be designated and added to the previously designated area. In case of designating plural areas to be raised in picture quality, relative priority may be accorded to these areas in the order in which these areas are to be raised in picture quality. The relative priority may be accorded to the areas by directly entering the rate of compression on the area basis or entering the numerals corresponding to the relative priority. If the external information inputting unit 60 is comprised of buttons or tablets capable of detecting the thrusting pressure, the relative priority may be set depending upon the sensed thrusting pressure. It is also possible to designate different priority stages in respective portions in the same area designated to be raised in picture quality. In designating the priority in the same area, it is possible to accord top priority to the mid portion and to lower the priority gradually towards the periphery like setting geographical contour lines. Alternatively, it is possible to accord top priority to an upper portion, a lower portion, a left-hand side portion or a right-hand side portion and to lower the priority gradually in a direction away from the top priority portion. The priority designation in the same area may be applied similarly in case only one area instead of plural areas is designated for raising the picture quality.

The external information inputting unit 60 is not limited to, for example, a joystick, which may be operated with hand or finger by the user, but may be designed so that a point to which the user's attention is directed is automatically detected and a range of a pre-set size centered about this focal point is designated as being the area to be raised in picture quality. Various systems may be envisaged as means for detecting the point (focal point). For example, a light beam is radiated to the eye of the user and the light from the surface or retina of the eye is received for measuring the direction of the pupil. The focal point may then be detected on the basis of the information correlating the pre-set position or direction of the pupil to the position on the picture. The method for detecting the focal point, that is the line of sight of the user, will be explained subsequently.

The external input information from the external information inputting unit 60 is sent to the high picture quality specifying information generating circuit 61 which is responsive to the external input information to generate the designation information derived from the external input information. The designation information may be comprised of the information corresponding to the time code of the picture including the area desired to be raised in picture quality, or to the in- or out-points, or the coordinate information, which is designated by the external information inputting unit 60 and which corresponds to the area desired to be raised in picture quality.

The coordinates may be set on the dot basis, in which case the high picture quality specifying information generating circuit 61 transforms the coordinates designated on the dot basis into macro-block based resolution convenient for the picture compression apparatus.

If plural areas to be raised in picture quality are designated in one and the same picture, the high picture quality specifying information generating circuit 61 captures the coordinate information of the respective designated areas. If the relative priority is simultaneously designated by external information inputting unit 60, the high picture quality specifying information generating circuit 61 also captures the priority information as the designated information. Although the priority may be shown by two values of 0 and 1 in the simplest case, it may be shown by plural stages of, for example, 8, 16, 32, 64 and so forth for finer designation.

Such priority designation may be made in case different priority stages are designated in one and the same area. If a human face and the neighboring area are designated as an area to be raised in picture quality, and the area is designated in, for example, eight priority stages, the value 8 specifying the top priority is accorded to the face portion and the priority is lowered progressively in a direction proceeding away from the face portion, with the value 1 being accorded to portions other than a human being.

The designation information, thus generated by the high picture quality specifying information generating circuit 61, is sent to the parameter setting circuit 62 for raising the picture quality of the designated area. The parameter setting circuit 62 generates a rate-controlling parameter in the quantization step controller 39 (designation parameter), based upon the designation information from the high picture quality specifying information generating circuit 61, and sends the designation parameter to the quantization step controller 39.

If, when the area to be raised in picture quality is designated, and the area including the area to be raised in picture quality is quantized, the quantization step width for the area to be raised in picture quality is reduced, the post-compression bit rate in its entirety tends to be deviated from the target bit rate. Thus the quantization step controller 39 manages control so that the quantization step width is increased for picture portions other than the area to be raised in picture quality for maintaining the target bit rate. That is, on reception of the designation parameter, the quantization step controller 39 manages control for reducing the quantization step width of the picture portion of the area desired to be raised in picture quality, while performing weighting on the information volume parameter for increasing the quantization step width for portions other than the area desired to be raised in picture quality.

Since the target bit rate is maintained while the designated area is raised in picture quality, the picture portions other than those in the area raised in picture quality become lower in picture quality than if the designated area is not raised in picture quality. However, this, may be tolerated since the designated area, that is the picture portion to which the attention of the operator is directed, is raised in picture quality.

On the other hand, the quantization step controller 39 finds the sum of the actually employed values of the quantization step width and the associated volume of the generated information, and combines these data into learning parameters. That is, with the quantization step controller 39, feedback occurs in such a manner that the basic quantization step width BQ, as set on the basis of the information volume parameter and the information specifying the code amount from the VLC circuit 17, becomes enlarged in value for achieving rate control for preferentially improving the picture quality of the designated area without troubles. The value of the basic quantization step width BQ corresponds to the basic compression ratio.

FIGS. 7 to 10 show illustrative diagrams for performing quantization step control for raising the picture quality by reducing the quantization step width of the area designated by the operator. The diagrams shown in FIGS. 7 to 10 illustrate the case in which priority is accorded. in one and the same designated area, as explained previously.

Figure 7:
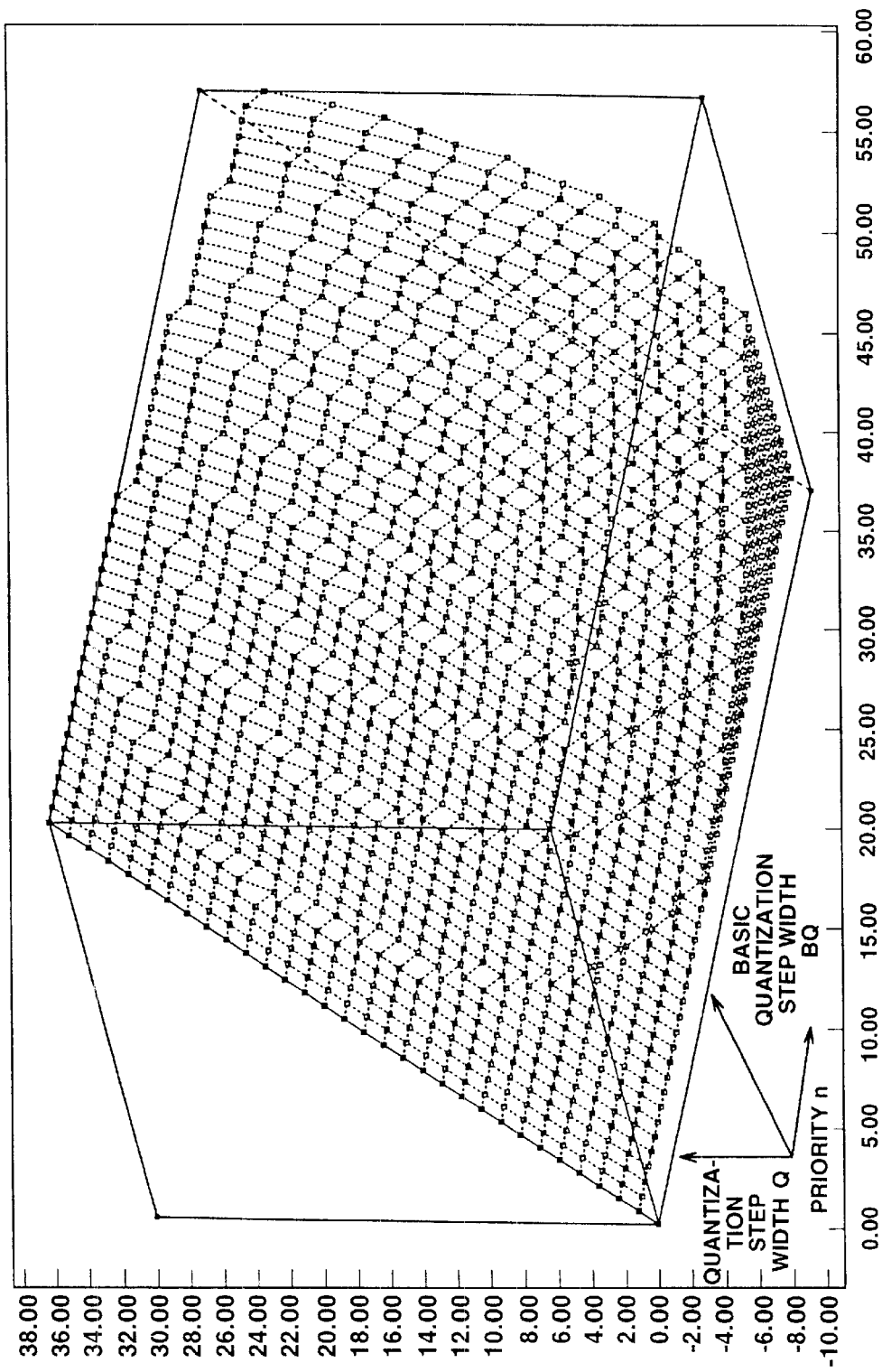
FIG. 7 shows a three-dimensional diagram in case there is a significant difference between the quantization step width specified by priority and the basic quantization step width.
Figure 8:
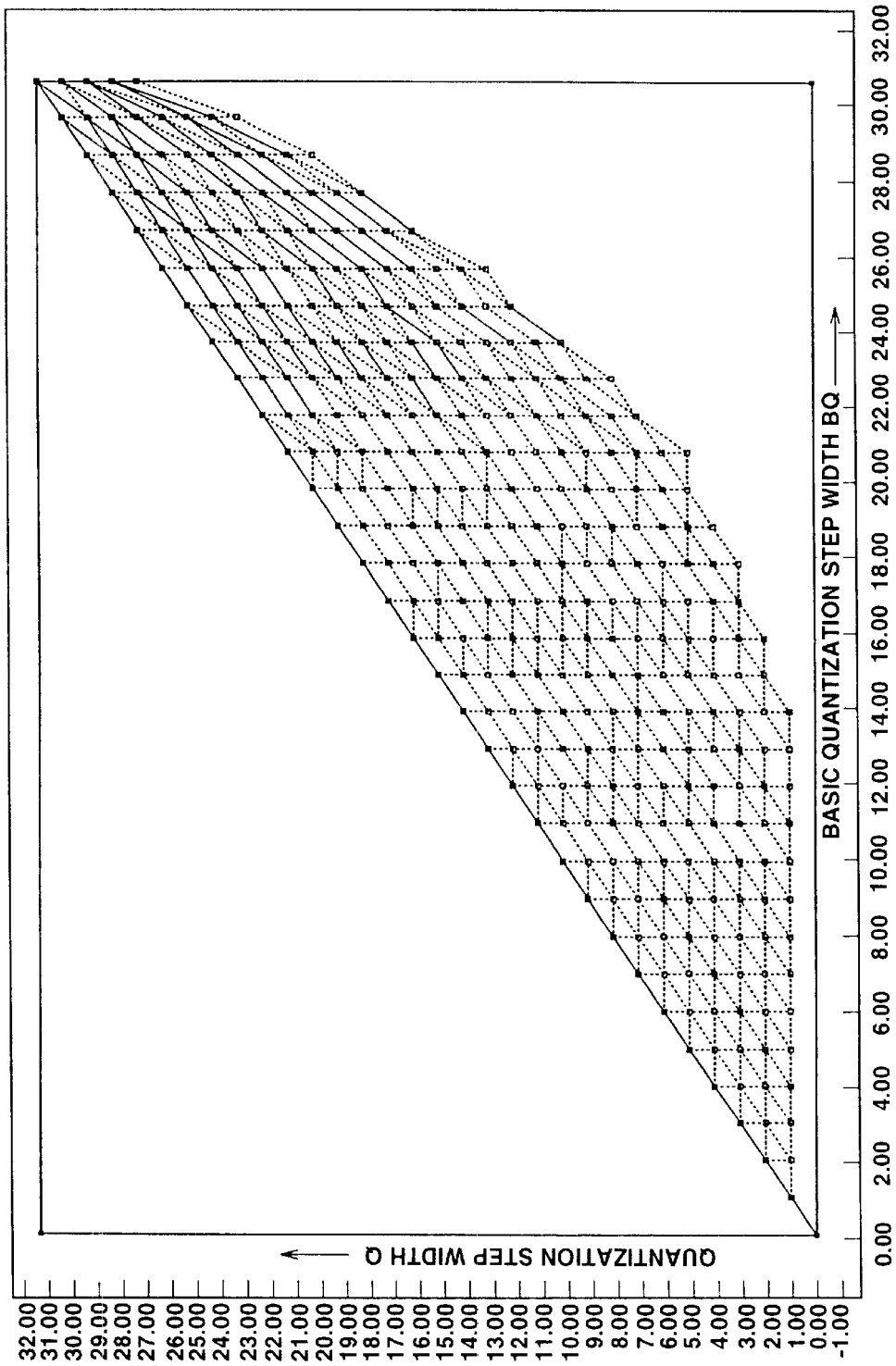
FIG. 8 illustrates a two-dimensionally represented relation between the basic quantization step width of FIG. 2 and the quantization sep width.
Figure 9:
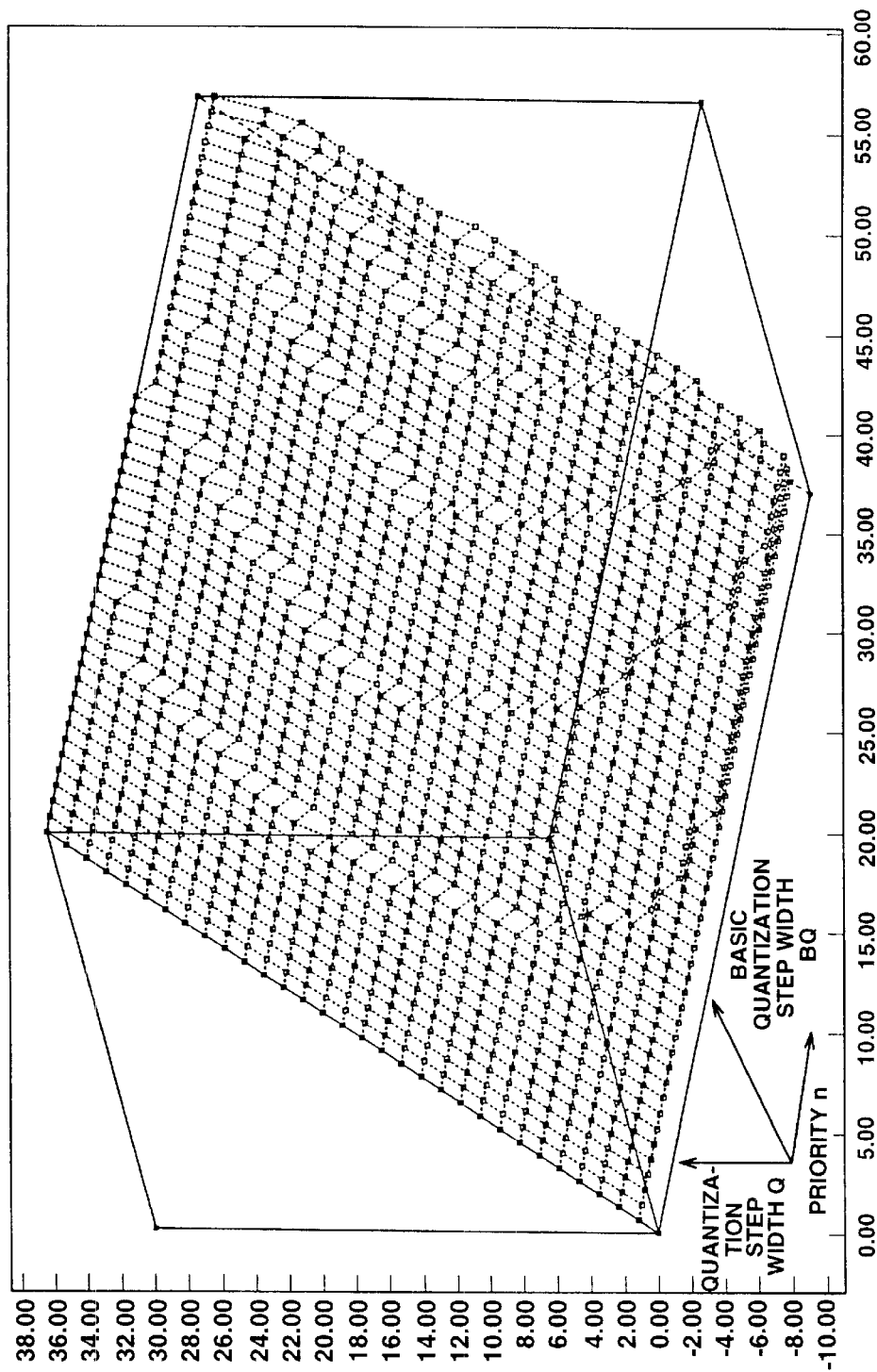
FIG. 9 shows a three-dimensional diagram in case a there is a small difference between the quantization step width specified by priority and the basic quantization step width.
Figure 10:
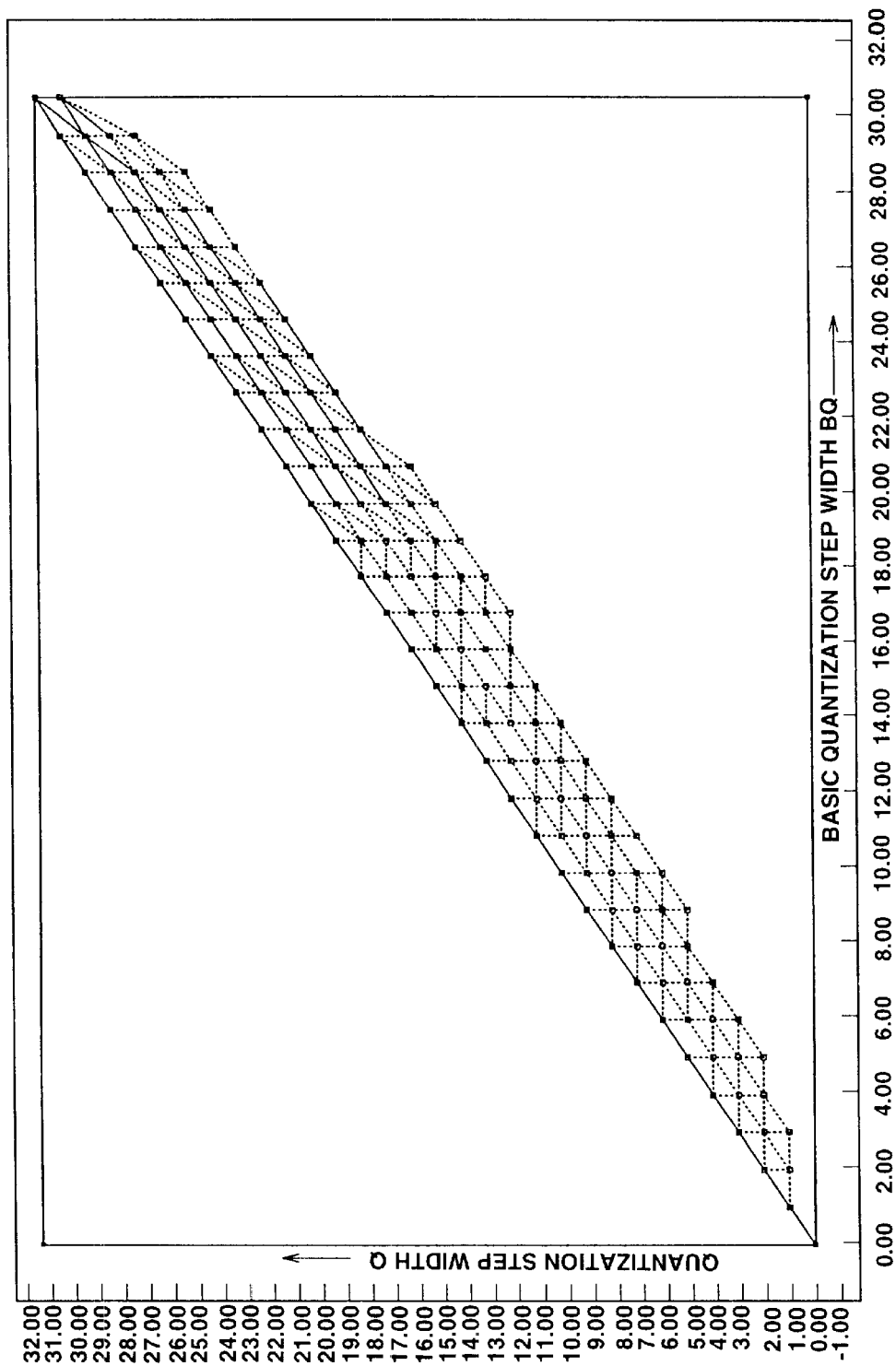
FIG. 10 illustrates a two-dimensionally represented relation between the basic quantization step width of FIG. 4 and the quantization sep width.

FIGS. 7 and 9 show three-dimensionally the relation between the quantization step as set by the quantization step controller 39 based upon the information specifying the information volume information and the code amount from the VLC circuit 17, the quantization step width Q as set by the quantization step controller 39 with the designation parameter being taken into account and the priority n, wherein the priority n is represented in, for example, 50 stages. FIG. 7 shows an example in which a large difference exists between the quantization step width Q designated by the priority n and the basic quantization step width BQ, that is in which the weighting on the priority is large. FIG. 9 shows an example in which a small difference exists between the quantization step width Q designated by the priority n and the basic quantization step width BQ, that is in which the weighting on the priority is small. FIG. 8 shows the relation between the basic quantization step width BQ and the quantization step width Q two-dimensionally and FIG. 10 shows the relation of FIG. 9 similarly two-dimensionally. The basic quantization step width BQ may take into account the input picture information volume as explained previously, or a pre-set value of the basic quantization step width BQ may also be employed.

It is seen from FIGS. 7, 8, 9 and 10 that the priority n can be weighted, while the effect of the priority n can be adjusted variably. The priority n may be set for taking into account the intention of the picture producer, while the variable effect of the priority n may be set to optimum values on encoding. The diagrams shown in FIGS. 7 to 10 may also be varied from macro-block to macro-block.

Figures 11A, 11B:
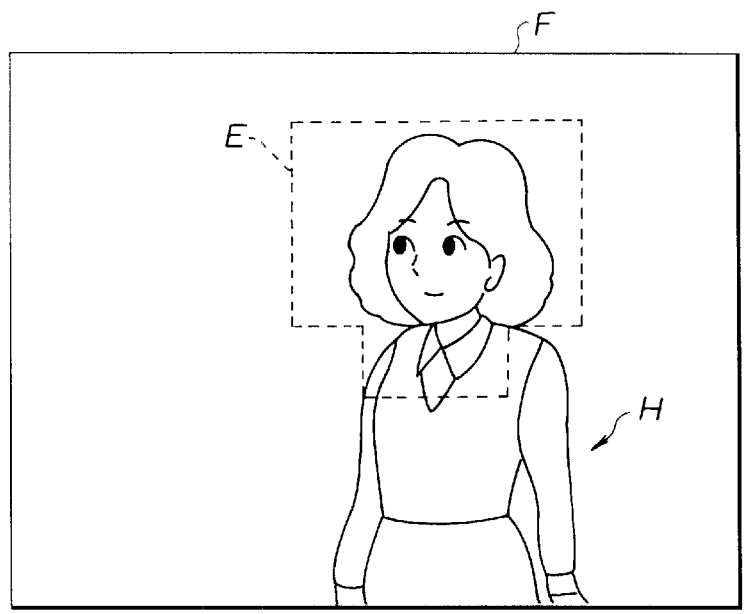
FIGS. 11A and 11B illustrate an example of the priority and designation of an area to be raised in picture quality.

The manner in which an area to be raised in picture quality in a real picture is designated and the quantization step width for the designated area is controlled using the diagrams of FIGS. 7 to 10 is explained in detail by referring to FIGS. 11A and 11B.

In FIGS. 11A and 11B, the picture size is 10×8 macro-blocks (MBs). If the picture is a picture F having a human being H, as shown in FIG. 11A, and if it is desired to raise the picture quality of the face and the neighboring portions of the human being H, the operator first designates an area E of the face of the human being H, specifically using a circular cursor, as explained subsequently. The operator also sets the priority so as to be maximum at the mid portion of the face and progressively lower from the mid portion towards the peripheral portion. Such designation information may be set from picture to picture. However, if contiguous pictures are of the same pattern, the pictures of the same pattern may be designated and only one designation information set for the pattern for saving the storage capacity.

If designation is done by the external information inputting unit 60 and the designated information is sent by the high picture quality specifying information generating circuit 61, the parameter setting circuit 62 sends the designation parameter to the quantization step controlling circuit 39.

The quantization step controlling circuit 39 sets the priority n, shown in FIG. 11B, on the basis of the designation parameter and the weighted information volume parameter, and sends the information on the quantization step width corresponding to the priority n to the quantizer 15. The respective numerals in FIG. 11B represent the priority n in fifty stages. Specifically, the value 50 for n corresponds to the highest priority, thus specifying that the quantization step width Q is small, and the decreasing value of n corresponds to the priority becoming progressively lower, that is that the quantization step width Q progressively approaches the basic quantization step width BQ. The value n of 0 specifies that the weighted basic quantization step width BQ is employed.

Since the area E of the face of the human being H has higher priority, the value of the quantization step width Q smaller than that for the remaining portion is used for raising the picture quality. In addition, the mid portion of the area E is raised further in picture quality.

Figure 12:
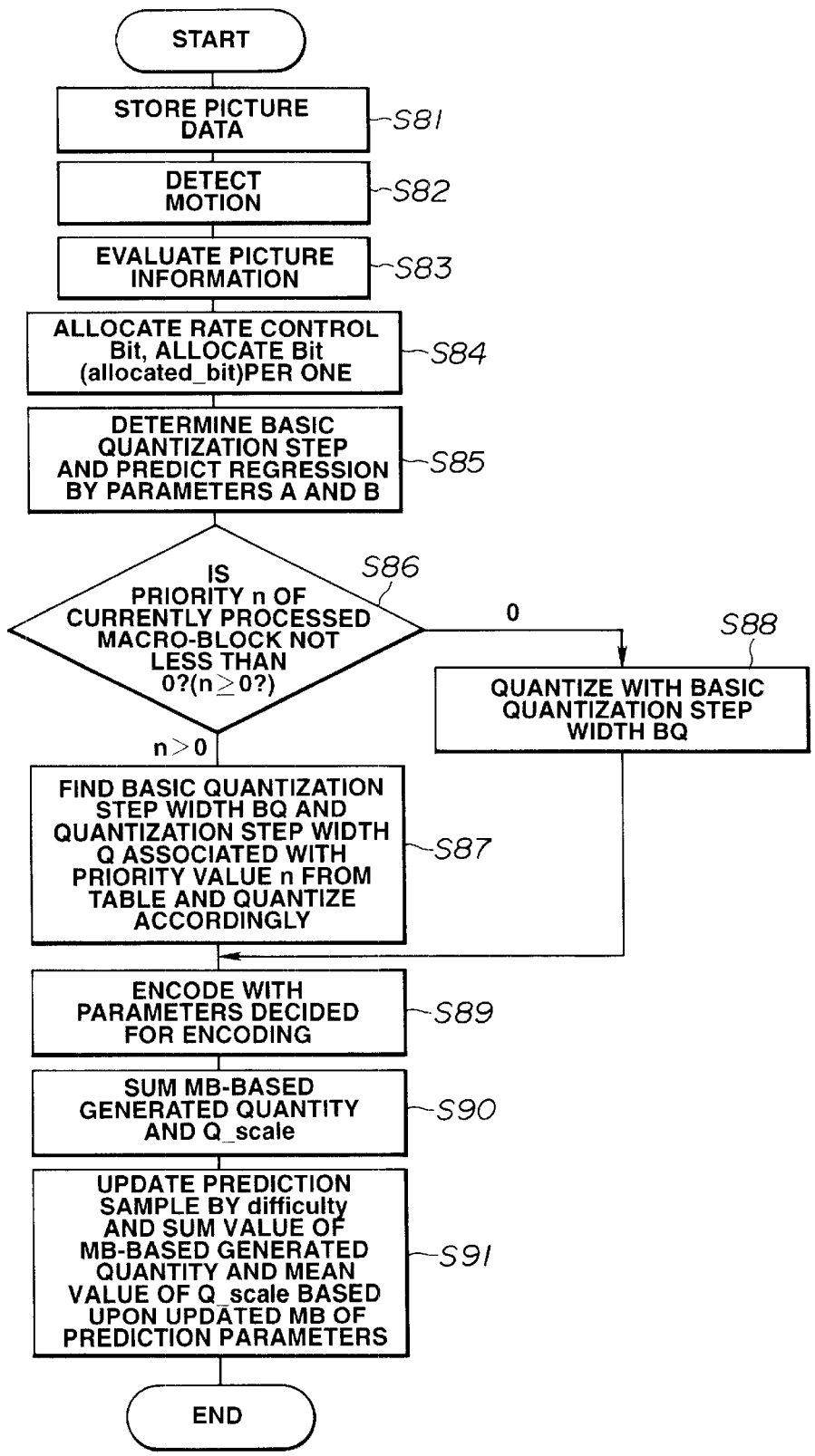
FIG. 12 is a flowchart for illustrating the operation of the apparatus shown in FIG. 6.

The processing flow in the present illustrative construction is explained by a flowchart of FIG. 12.

At step S81, picture data entering the input terminal 1 is sequentially stored in the frame memory 40. At step S82, the motion vector required for data compression by inter-frame predictive coding is detected and generated by the motion detector 38 and by the motion vector generating circuit 33, respectively. That is, at step S82, motion detection is executed so that picture data stored in the frame memory 40 will be encoded as P- or B-pictures in accordance with a pre-set schedule. The I-picture is not specified as a picture for motion detection because it is not fixed at this time which of the picture data is to be the I-picture and also no motion compensation is required for the I-picture so that any picture data later may become the I-picture.

At the next step S83, the picture information evaluation circuit 50 reads out and stores the sum of absolute values of errors (absolute difference AD) or the minimum distortion used for motion detection as a parameter used for encoding (second parameter). The absolute difference AD of the errors is the sum of absolute values of the differences between a search-side macro-block as sliced by the motion vector found on motion detection and a reference-side macro-block. The reference-side macro-block is found by dividing a referenced-side picture into 8×8 pixel blocks comprised of 8×8×4 pixel luminance data macro-blocks and 8×8×2 pixel chroma data macro-blocks. The absolute difference AD may be found by the following equation (1):

$$\text{block } AD = \sum_{i=1}^{8} \sum_{j=1}^{8} (\text{abs}(ref[i, j] - \text{search}[i, j])) \qquad (1)$$

where ref[i,j] is a pixel at a position(i,j) and search[i,j] is a pixel at a search MB position (i,j).

The absolute difference is summed for respective macro-blocks in the block to find the sum of absolute values of errors of the macro-blocks. This parameter is used for estimating the information volume which also takes into account the picture correlation in case of data compression by inter-frame predictive coding.

The parameter SAD for estimating the picture information volume is the sum of the absolute values of the errors (AD) in a picture, as indicated by the equation (2):

$$SAD = \Sigma AD \qquad (2)$$

Of course, the minimum distortion may also be employed instead of the sum of absolute values of the errors (AD).

At step S83, the picture information evaluation circuit 50 evaluates, on the pixel basis, the activity and the mean absolute difference MAD of errors in addition to the parameter produced on motion detection.

The mean absolute difference MAD of errors is a parameter for estimating the information volume of the I-picture and is found on the 8×8 pixel block basis by the following equation (3):

$$\text{block}MAD = \sum_{i=1}^{8} \sum_{j=1}^{8} (X(i, j) - \overline{X}) \qquad (3)$$

where X(i,j) is a pixel of a position (i,j) and $\overline{X}$ is a mean value of pixels in a block.

This is summed for respective blocks in a macro-block and the values of each macro-block is summed for a picture. The resulting sum is used as a parameter SMAD specifying the information volume of the picture as the I-picture.

$$MAD = \Sigma blocMAD$$

$$SMAD = \Sigma Mad \qquad (4)$$

The activity is a parameter for quantitating the state of a pixel for further raising the compression efficiency as the picture quality is maintained by finely controlling the quantization step responsive to the state of a picture portion of a macro-block in a picture. For example, in a portion of a block where the pixels undergo little changes in level (flat portion), distortion due to quantization becomes more apparent and hence the quantization step should be reduced. Conversely, for a block of a complex pattern with ample level changes, quantization distortion is less apparent, while the information volume is also larger, so that the quantization step should be coarser. Thus, a parameter specifying the block flatness is used as the activity.

At the next step S84, bit allocation for rate control is performed at a quantization step controller 39. At step S84, the amount of bits allocated to each picture is set on the basis of the information volume parameter found at step S83. In other words, in carrying out bit allocation, the amount of bits allocated to each picture is determined using a pre-checked information volume parameter for each picture prior to the processing of reducing the quantization step width and increasing the amount of bit allocation for an area to be raised in picture quality as explained previously. A larger number of bits and a smaller number of bits are used for an I-picture or a picture having an abundant information volume and for a B-picture or a picture having a smaller information volume, respectively.

In the present illustrative construction, bit allocation is done as shown in FIG. 7, with a GOP as a domain:

Total Bit Count=(Bit Rate [bit/s]×Number of Picture in GOP [picture])/(Picture Rate [picture/s]) [bits] (6)

Available Bits=(Total Bit Count×Target Picture Information Volume Parameter)/Sum of Picture Information Volume Parameters for GOP) [bits] (7)

The information volume parameter employed in the equation (7) is the parameter SMAD or SAD multiplied by compression picture type based multipliers. These multipliers adjust the relation between the inter-picture-type parameters and the picture quality.

The sum of the information volume parameter for a GOP is found by the equation (8):

(sum of the information volume parameter for a GOP)=Ki×ΣDifi+ Kp×ΣDifp+Kb×ΣDifb where Difp is the difficulty of a P-picture and Difb is the difficulty of a B-picture.

In the quantization step controller 39, the basic quantization step width is determined on the basis of the regression prediction by the learning parameters A and B. That is, the basic quantization step is determined (estimated) by regression prediction from the above-mentioned bit allocation for a picture and difficulty.

By summing the sum of mean absolute errors (MAD) and the sum of absolute values of the errors (AD) for a picture, it becomes possible to measure the information volume parameter (difficulty) of a picture and hence to estimate the quantization step once the information volume parameter and the post-quantization data volume are determined from past records.

The quantization step controller 39 of the instant illustrative arrangement determines the basic quantization step width (quantization scale Q_ scale), from the amount of bit allocation per picture (allocated_ bit) per picture and the difficulty.

It is first assumed-that the relation log(allocated_ bit/difficulty)=A*log(Q_ scale)+B (10)

holds and A, B in the above equation (10) are previously found by learning. The quantization scale(Q_ scale) id found from the equation (11) transformed from the equation (10):

Q scale=exp((log(allocated_ bit/difficulty)−B)/A) (11)

The quantization step width, thus found, is the basic quantization step width of the picture.

At steps S86 to S88, the quantization step controller 39 controls the quantization step width with respect to the area to be raised in picture quality. If a method of simply setting the value of the quantization scale (Q_ scale) of the designated area is used, the desirable bit rate tends to be surpassed to disrupt the output buffer 18 since the overall rate control is disregarded in favor of raising the picture quality even if the area is raised in picture quality. In the instant illustrative arrangement, the quantization step width of the designated area is reduced for raising the picture quality of the designated area and the basic quantization step width for the remaining portion is increased for accommodating the. overall bit rate within the target bit rate. To this end, it is judged at step S86 whether or not a macro-block being processed represents an area designated to be raised in picture quality and has the priority higher than 0. If the macro-block is found at step S86 that it has priority equal to 0, processing transfers to step S88 where the data of the macro-block is quantized with the basic quantization step width BQ. If the priority is found to be zero, the quantization step width of the portions other than the designated area may be increased in inverse proportion to the priority of the designated area and the total thereof. If it is judged that n>0 at step S86, processing transfers to step S87 where the basic quantization step width BQ derived from the usual algorithm and the quantization step width Q associated with the priority n are fond for the above diagram. The quantizer 15 quantizes data of the macro-block based upon the quantization step width Q.

Thus, with the present arrangement, the priority value is handled on the same level as the other parameters. If the effect of priority is to be intensified relative to the remaining parameters, weighting or the similar method may be employed.

At the next step S89, encoding is carried out at the VLC circuit 17. Since all parameters for compression encoding have been set as described above, encoding is carried out in accordance with the MPEG rule.

At the next step S90, the bits generated on the macro-block basis and the quantization scale (Q_ scale) are summed.

Finally, at step S91, the above-mentioned parameters are updated. That is, the prediction samples are updated on the basis of the macro-block based mean value of the quantization step, the macro-based sum of generated bits and the difficulty. The relation between the volume of the picture information, the basic quantization step and the post-compression data volume depends upon the compressed picture. Thus the parameter used in the equation representing the relation or the prediction parameter is learned by feeding back the post-compression data volume for improving prediction accuracy. The learning parameters A and B are learned and corrected by the following method from one picture type to another. If, for example, the mean or average value of the macro-block based quantization scale (Q_ scale) is (average_ Q) and the generated bits after compressing a picture is (generated bit), the following equation (12):

$$x = \log(\text{average}\_ Q), \quad y = \log(\text{generated bit/difficulty}) \quad (12)$$

holds. The parameters A and B may be found by least square error method in accordance with the following equations (13) and (14):

$$x = (\text{sum}(x \neq y) - (\text{sum}(x) \neq \text{sum}(y))/n)/\text{sum}(x \neq y) - (\text{sum}(x) \neq \text{sum}(x)/(n)(13)$$

$$B = ((\text{sum}(y)/n - a) \neq (\text{sum}(x)/n) \quad (14)$$

Figure 13:
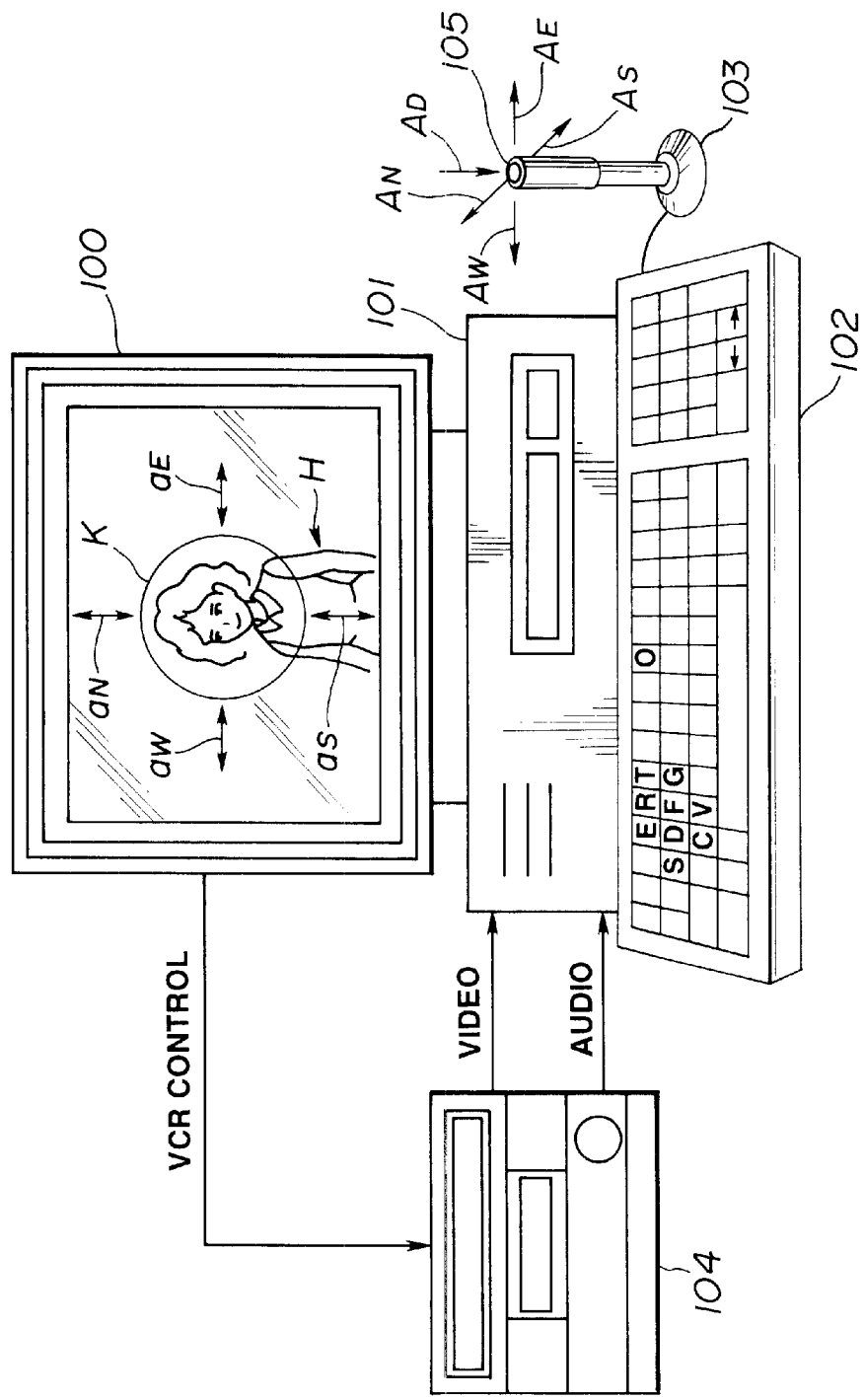
FIG. 13 illustrates a system configuration to which the apparatus shown in FIG. 6 is applied.

FIG. 13 shows the overall arrangement for real-time designation of the area to be raised in picture quality as the operator view the playback picture. The arrangement and the operation of FIG. 13 is now explained.

The system of FIG. 13 includes a monitor 100 on which to display a picture, a computer 101 having enclosed therein an MPEG decoder board shown in FIG. 6, and:a keyboard 102 and a joystick 103, as the external information inputting unit 60 connected to the computer 101. The system also includes a video cassette recorder 104 for recording/reproducing the video or audio information on or from a recording medium, such as a video cassette tape.

The operation of real-time designation of the area to be raised in picture quality as the operator views the playback picture is as follows:

The computer 101, having the enclosed MPEG decoder board, displays the MPEG playback picture on a screen of the monitor 100, while also displaying a circular cursor K by superimposition on the screen.

The mid-point position of the cursor K can be changed by operation of the joystick 103. That is, if the joystick 103 is actuated in directions AN, AS, AE or AW, the cursor K on the screen of the monitor 100 is moved in directions aN, aS, aE and aW, respectively. Also, the joystick 103 has an upper button 105 which may be pressed as indicated by AD for controlling the validity/invalidity of the cursor K. The validity/invalidity of the cursor K may be known by the cursor K being changed in color depending upon the actuation of the button 105. Specifically, the cursor may be set to invalid or valid according as the cursor color is white or green, respectively.

The keyboard 102 includes plural keys to which are allocated the following functions, for controlling the cursor K or the video cassette recorder 104, in addition to the usual character entry function:

For example, the function of controlling the size of the circular cursor K is allocated to the keys D and F. If the key D or P is pressed, the circular cursor k is increased or decreased in size, respectively. Also, the function of controlling the shape of the circular cursor K is allocated to the keys R and V. If the key R or V is pressed, the circular cursor k is changed to a vertically elongated elliptical shape or to a horizontally elongated elliptical shape, respectively.

The functions of controlling the video cassette recorder 104 are allocated to the keys G, S, C, T, E, → and ←. For example, if the keys G, S, C, T, E, → and ← are pressed, reproduction start, reproduction stop, intermittent playback, gradual increase in playback speed, gradual decrease in playback speed, fast feed and fast rewind, are carried out, respectively.

In addition, the additional mode on/off function is allocated to the key 0. If the key 0 is pressed, the information addition mode is turned on or off by a toggle operation. With the information addition mode, the cursor K is displayed by, for example, a broken line, for distinction from the usual cursor K.

If the joystick 103 and the keyboard 102 are used, and the joystick 103 is actuated with a right hand, with the left hand being set at the home position of the keyboard 102, a blind-touch operation may be made, with the line of sight being directed to the screen. For fast feed, fast rewind and on/off operation of the information addition mode, the associated keys of the keyboard are pressed with the right hand.

Reproduction is then started. If there is any picture portion the picture quality of which is to be raised, the button 105 on the joystick 103 is pressed for validating the cursor K.

The cursor K is set on the portion desired to be raised in picture quality and the cursor is set to the desired size, position or shape by the operation of the associated keys. On termination of designation of the area to be raised in picture quality, the button 105 on the joystick 103 is pressed for invalidating the cursor K.

The time codes of the pictures and the coordinate information of the cursor K are sequentially recorded on a recording medium, such as a hard disc in the computer 101, only during the time the cursor K remains valid. During recording, the recorded time code information less a pre-set time, such as 0.8 sec, may be recorded in consideration of the delay in reaction of the operator. The pre-set time can be varied, if desired. Since deviation in the time code information or errors in the coordinate information are not critical, it is unnecessary to raise the input interfacing accuracy.

If, after designating the cursor K, it is desired to re-designate the cursor, re-designation may be carried out after fast rewind. If there is any input information, a red cursor, for example, may be displayed on the screen. In such case, two cursors are displayed on the screen. This enables the operator to know the contents of the previously entered information. If a second entry operation is then performed, the previous information is replaced by the newly entered information. If the key 0 is again pressed to set the information addition mode, the new information is recorded as the additional information without erasure of the old information. If it is desired to designate plural areas to be raised in picture quality in the same picture, the information collection can be done from plural places by employing the function of information addition.

If the object performs vigorous movements, the intermittent feed function may be employed. That is, if the cursor is designated for intermittent operation frame by frame, cursor designation can be done correctly to accommodate vigorous object movements. In this case, the pre-set time is not subtracted from the time code information for recording. The similar operation may also be performed by slow reproduction instead of by intermittent feed. In such case, tolerably efficient data entry can be achieved although the operating time becomes slightly longer than in case of the real-time operation. This pre-set time may also be changed if desired.

The function allocation for the joystick 103 or the keyboard 102 is merely exemplary and may be modified for ease of operation for the user. The joystick may be replaced by the mouse, track ball or the tablet, while the keyboard may be replaced by a dedicated interface.

In addition, the automatic object follow-up function of the cursor may be employed. In such case, once the operator designates the object to be followed, the object is automatically followed on the screen until the object disappears from the screen, so that it is unnecessary for the operator to designate the cursor position manually, while it is only necessary for the operator to designate the size, or shape the cursor. If the automatic follow-up is in error, it can again be performed after rewind as explained above. Meanwhile, if the automatic object follow-up is improved in accuracy, the volume of the operations by the operator is decreased. However, the operator has to command as to which of the picture portion is to be raised in picture quality.

The foregoing description has been directed to real-time designation of the area to be raised in picture quality with visual inspection of the displayed picture. For such real-time designation with visual inspection of the displayed picture, it is also possible to collect the coordinate and time code information prior to encoding as described above. In such case, the recording tape is reproduced on the video cassette recorder 104 for display on the screen in place of the MPEG playback picture and the cursor designation is performed as described above. The playback control is by a corresponding operation of the video cassette recorder 104 by a signal such as RS-422 from the computer 101.

Figure 14:
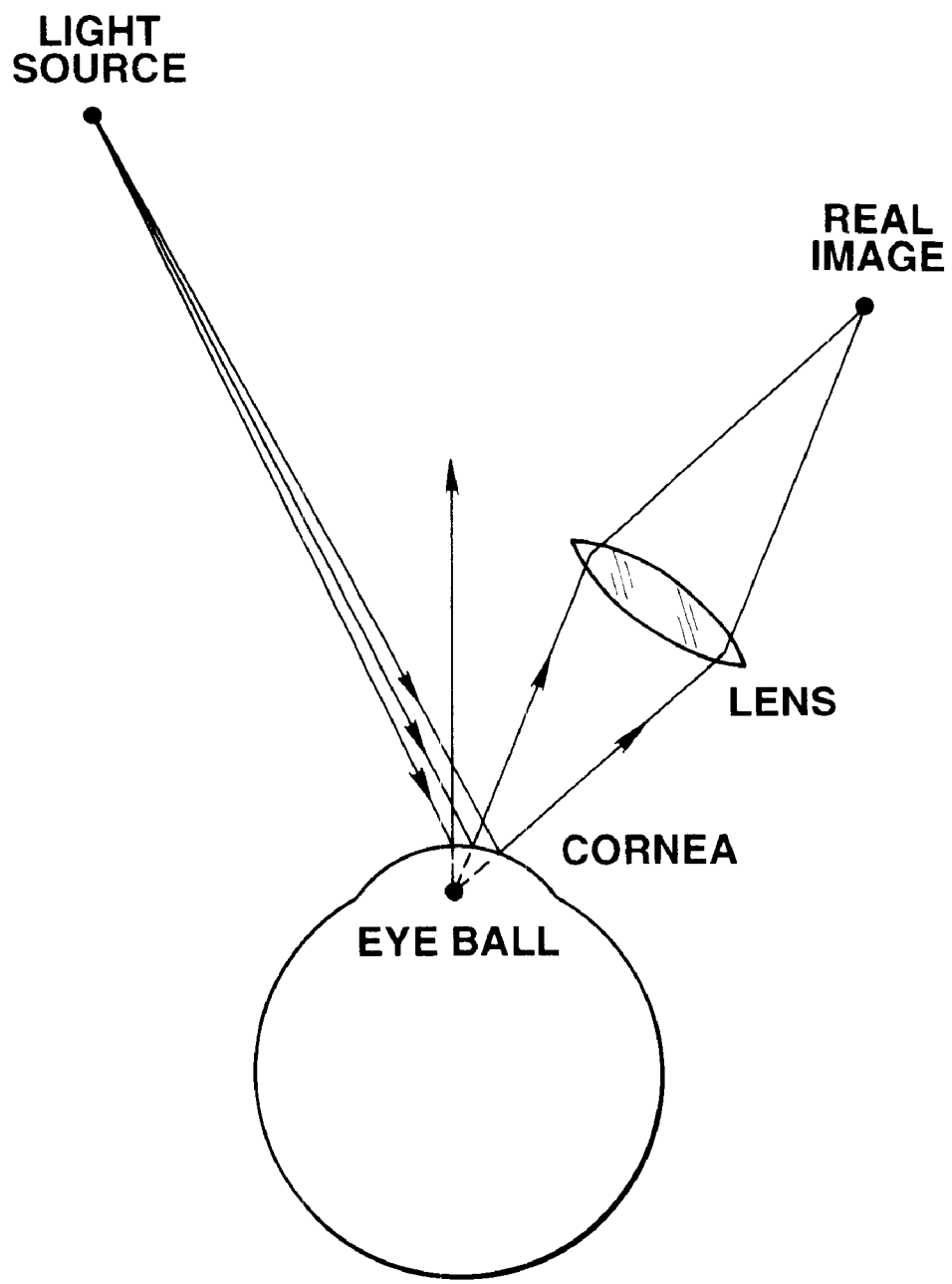
FIG. 14 illustrates the principle of detection of the line of sight.

The method of detecting the line of sight is explained. In this case, a sensor for sensing the line of sight of the operator is used in place of the joystick 103 for designating the cursor position. The method for detecting the line of sight, disclosed in JP Patent Kokai Publication JP-A-6-82474, is now explained briefly by referring to FIG. 14 showing the principle of the line of sight detection. Referring to FIG. 14, the light radiated from a light source is reflected by the cornea of the eyeball so as to be converged by a lens to form a real image. The center of curvature of the cornea is not coincident with the center of rotation of the eyeball so that the real image position is moved with rotation of the eyeball. Thus the direction of eyeball rotation, that is the line of sight, can be observed by measuring the real image position. This technique is termed an eye camera (television eye marker camera) and is actually in use. With a usual eye camera, it is necessary to use a face securing device for securing the center of rotation of the eyeball.

The foregoing description has been directed to raising the picture quality by raising importance attached to the designated area. However, importance attached to the designated area may be lowered and hence the designated area lowered in importance and in picture quality while the target bit rate is maintained, thus resulting in raising the picture quality of remaining portion of the picture. Such aspect may similarly be comprised within the scope of the present invention.

What is claimed is:

1. A picture compression apparatus comprising:
   means for compression input picture data for a first frame;
   basic compression ratio setting means for setting the basic compression ratio in compressing the input picture data for said first frame by said compression means;
   means for designating an area in the first frame input picture;
   designated area importance setting means for setting the importance in compressing the input picture data for said first frame corresponding to the area designated by said designation means;
   compression ratio modifying means for modifying the basic compression ratio based upon the importance for said designated area as set by said designated area importance setting means; and
   automatic follow-up means for automatically following an object in a second frame which is positioned within said designated area of said first frame thereby applying said modified compression ratio to said object, even if said object is positioned differently in said second frame.

2. The picture compression apparatus as claimed in claim 1 wherein said compression ratio modifying means has data rate controlling means for controlling the post-compression data rate to a target data rate by modifying said basic compression ratio based upon the importance set for said designated area.

3. The picture compression apparatus as claimed in claim 1 wherein said designation means has designated picture generating means for generating a designated picture for specifying a portion of the picture and designated picture movement means for moving the designation means for changing the specified portion of the designated picture displayed on said screen responsive to operation by the operator.

4. The picture compression apparatus as claimed in claim 1 wherein said designation means has focal position detection means for detecting the focal position of the eye of the operator on the screen and wherein said designated area is designated by detecting the focal position.

5. The picture compression apparatus as claimed in claim 1 wherein said designation means designates plural areas.

6. The picture compression apparatus as claimed in claim 1 wherein said designation means has priority order setting means for setting the priority order of importance within said designated areas.

7. The picture compression apparatus as claimed in claim 6 wherein said priority order setting means designates the priority order in the designated area in the shape of geographical contour lines.

8. The picture compression apparatus as claimed in claim 1 wherein said designation means has priority order setting means for setting the priority order of importance to each of the plural designated areas.

9. The picture compression apparatus as claimed in claim 7 wherein said priority order setting means designates the priority order in each of the designated areas in the shape of geographical contour lines.

10. The picture compression apparatus as claimed in claim 1 wherein said compression means performs compression in each of blocks divided from an input picture and wherein the input picture data is compressed on the block basis.

11. The picture compression apparatus as claimed in claim 1 wherein said compression ratio modifying means learns the relation between the compression ratio employed for compression, post-compression data quantity, the basic compression ratio and the importance for the designated area and predicts the compression ratio based upon the learned results.

12. A picture compressing method comprising the steps of:

setting a basic compression ratio in compressing input picture data for a first frame;

designating an area in the first frame input picture;

setting the importance in compressing the input picture data for said first frame corresponding to the area designated in said designating step;

modifying the basic compression ratio based upon the importance for the designated area as set by said designated area importance setting step;

compressing the input picture data using the compression ratio obtained by said modifying step; and automatically following an object in a second frame which is positioned within said designated area of said first frame thereby applying said modified compression ratio to said object, even if said object is positioned differently in said second frame.

13. The picture compressing method as claimed in claim 12 wherein said compression ratio modifying step has a data rate controlling step for controlling the post-compression data rate to a target data rate by modifying said basic compression ratio based upon the importance set for said designated area.

14. The picture compressing method as claimed in claim 12 wherein said designation step has a designated picture generating step for generating a designated picture for specifying a portion of the picture and a designated picture movement step for moving the specified portion of the designated picture displayed on said screen responsive to operation by the operator.

15. The picture compressing method as claimed in claim 12 wherein said designation step has a focal position detection step for detecting the focal position of the eye of the operator on the screen and wherein said designated area is designated by detecting the focal position.

16. The picture compressing method as claimed in claim 12 wherein said designation step designates plural areas.

17. The picture compressing method as claimed in claim 12 wherein said designation step has priority order setting means for setting the priority order of importance within said designated areas.

18. The picture compressing method as claimed in claim 12 wherein said designation step has a priority order setting step for setting the priority order of importance to each of the plural designated areas.

19. The picture compressing method as claimed in claim 12, further comprising the step of designating the priority order in the designated area in the shape of geographical contour lines.

20. The picture compressing method as claimed in claim 12 wherein said compression means performs compression in each of blocks divided from an input picture and wherein the input picture data is compressed on the block basis.

21. The picture compressing method as claimed in claim 12 wherein said compression ratio modifying means learns the relation between the compression ratio employed for compression, post-compression data quantity, the basic compression ratio and the importance for the designated area and predicts the compression ratio based upon the learned results.

* * * * *